INVENTORS
GEORGE E. MacDONALD
ENNIO M. GHERARDI
BY
*Darby & Darby*
ATTORNEYS

United States Patent Office 3,195,411
Patented July 20, 1965

3,195,411
METHOD AND SYSTEM FOR REPRODUCING TWO OR THREE DIMENSIONAL OBJECTS BY PHOTOGRAMMETRY
George E. MacDonald, East Williston, and Ennio M. Gherardi, West Babylon, N.Y., assignors to Lockwood, Kessler & Bartlett, Inc., Syosset, N.Y., a corporation of New York
Filed Aug. 8, 1961, Ser. No. 130,125
18 Claims. (Cl. 90—13.5)

This invention relates to photogrammetric techniques and more particularly to a system and method for using photogrammetry to restitute an object both graphically and numerically.

In recent years, automatic machine tools have been developed which are capable of being operated by a computer (numerical) program. These automatic machines perform substantially all of the necessary operations, such as milling, cutting, routing, grinding, in the manufacture of tools, dies, and other objects. The automatic operation of these machines by computer programs substantially reduces the necessity of having human operators with the desirable consequence of reducing the cost of the finished article.

The production of computer programs to operate the automatic machine tools has been accomplished heretofore in several ways. Two of the most commonly used ways are the mathematical and semi-automatic formation of the programs. One mathematical process for developing a computer program to control an automatic machine tool is described in an article appearing in "Business Week," June 17, 1961 edition, at page 80, and entitled "Tool With Skill of a Machinist." In the semi-automatic approach, the computer program is evolved directly from the model of the object to be made or else from blueprints of various sections of the article. Both of these processes may be considered as numerical restitution of an object.

In general, many methods are used to make tools, dies and other objects. In one process of manufacturing a die, to be used for stamping, pressing or molding a three-dimensional part, a model is first made of the part and then the die is made directly from the model or from a cast of the model. This process, as is well known, is time consuming, expensive, and subject to various sources of error. In another manufacturing process which is used where frequent changes are to be made on the model before a final design is selected, a time consuming process of "freezing" the various models at their different stages is necessary in order to be able to reconstruct all or a portion of a particular model for the final design. This is normally done by making intermediate templets (graphical restitution) of various cross-sections of the models and storing these templets for future use in reconstructing any portion of a particular model. Of course, making these intermediate templets is necessarily expensive and time consuming and, in many cases, subjects the final design to serious delays.

Heretofore, in the two manufacturing processes described above and in other manufacturing processes, it has not been possible to produce a computer program for operating an automatic machine tool directly from a model or cast of the final object or from the final object itself. This, of course, represents a serious drawback in the full utilization of the automatic machine tools with consequent production delays and increased costs.

The present invention is directed to the graphical and numerical restitution of an object by photogrammetric techniques. In accordance with the principles of the invention a system and method of operation are provided whereby two dimensional representations (profiles) of various cross-sections of an object and a computer program to operate an automatic machine tool may be produced directly from the object or a model or cast thereof. In the present invention, the model or object to be restituted is stereoscopically photographed after it has been oriented with respect to its surroundings and with respect to the stereo cameras. The stereo photos of the object are placed in a stereo-plotter instrument and various profiles of the stereo photos are made to obtain three dimensional coordinate information of the object. The output of the stereo-plotter instrument is used to produce graphical representations of the object profiles, which may be reproduced as two-dimensional templets, and/or to produce a numerical program to control an automatic machine tool which will make the finished parts and/or dies.

The system of the present invention has many advantages. One of these is readily apparent when its use is considered in the manufacture of objects from a model which undergoes a considerable number of changes before the design is finalized. In this case, rather than making templets by hand during intermediate design stages, stereo photographs may be taken of the intermediate designs and a particular design or portion thereof may be restituted either graphically and/or numerically at some later time as desired. Therefore, any object or portion thereof can be reproduced from the stereo-photos. To illustrate another advantage of the present invention, there are many instances in which a large supply of parts must be maintained for a number of years after a particular model of a product has been dropped from production or replaced by a newer model. This usually necessitates maintaining large warehousing facilities for storing the parts and the attendant disadvantages of cataloging and finding the various parts when necessary. In accordance with the present invention, rather than stock the actual physical parts, stereo-photographs are made of the parts. These stereo-photos can be stored in a minimum amount of space and should it become necessary to reproduce a particular part or a die therefor at some later date, the photographs may be restituted graphically and/or numerically and this information used to produce duplicates of the same part.

It is therefore an object of this invention to provide a system and method for graphically and/or numerically restituting objects.

Another object of this invention is to provide a system and method whereby a numerical program for operating an automatic machine tool is produced directly from an object or a model thereof.

Still a further object of this invention is to provide a system for producing numerical programs for automatic machine tools by the use of stereo-photogrammetry techniques.

Other objects and advantages of the present invention will become more apparent upon reference to the following specification and annexed drawings in which.

Figure 1:
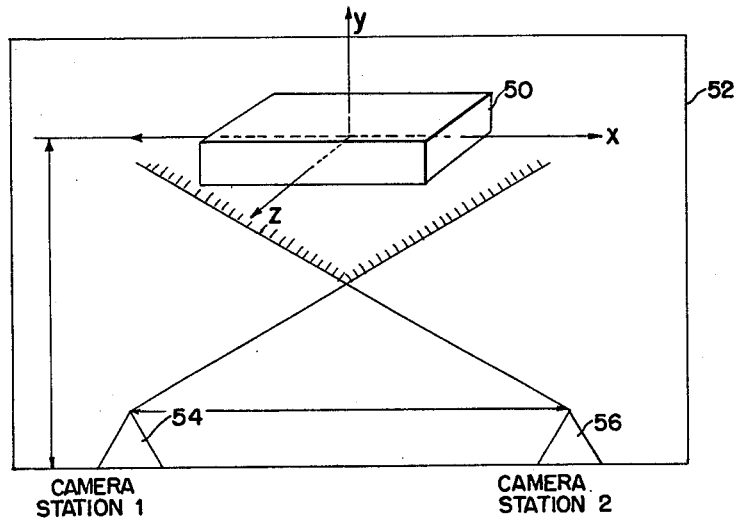
FIGURE 1 shows a typical setup for taking stereophotographs of an object to be restituted in accordance with the principles of the invention.

Referring to FIGURE 1, a three-dimensional object 50 to be restituted is shown in position with respect to two cameras 54 and 56. The cameras are respectively located at camera stations No. 1 and No. 2, so that stereo-pair photos may be taken. The object 50 is shown as having imaginary $x$, $y$, and $z$ coordinate lines which originate from a point at the object center. These coordinate lines define imaginary $x$, $y$ and $z$ datum planes for the object. It should be realized that the object 50 may be either two or three-dimensional and of any size or shape. Also, the term object is used to define a finished article, or die, mold model or cast thereof, or any other type of physical representation of the final article to be made.

The cameras 54 and 56 are preferably mounted on a rail for horizontal (x axis) movement and the cameras and/or rail are also made movable so that the cameras may be adjusted in the y and z coordinate axes. The cameras are also angularly adjustable with respect to x, y, and z axes. As is well known and in accordance with conventional stereo-photographic techniques, a three-dimensional representation of the object 50 within the intersecting fields of view of the cameras represented by the cross-hatched lines may be made from the stereo-photo pairs taken by the two cameras 54 and 56. As many sets of stereo-pairs are taken of the object 50 as are needed for the complete restitution of the object. This number will vary in accordance with the size and complexity of the object and the type of camera used.

Figure 2:
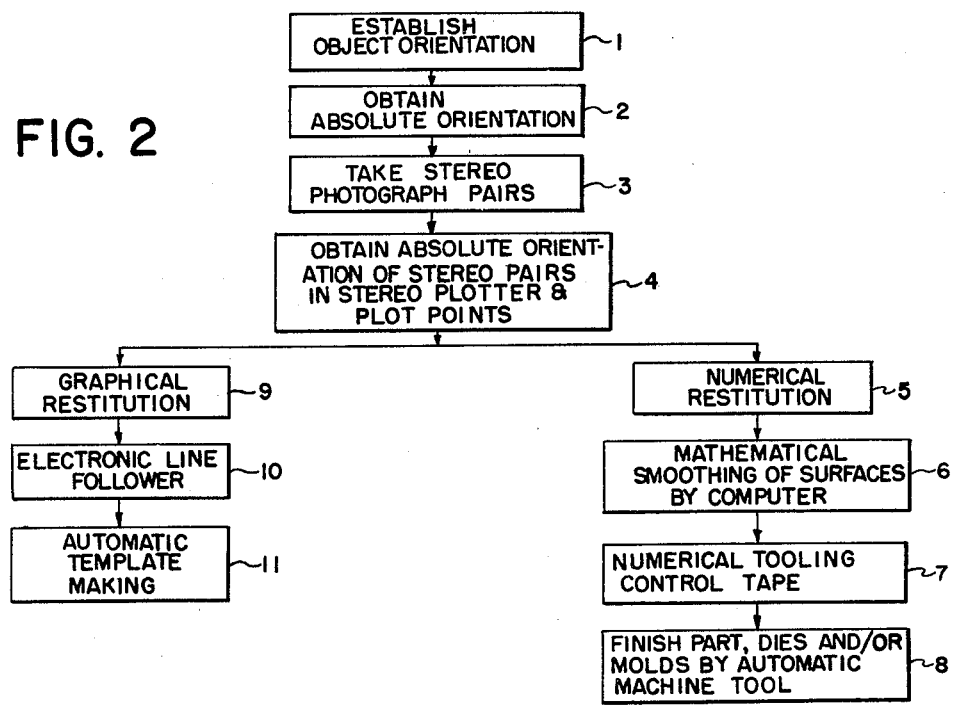
FIGURE 2 shows an overall flow-chart diagram of the process and system of the present invention.

The graphical and numerical restitution of the object 50 may be understood by referring to FIGURE 2. Step 1 of the restitution is to establish orientation of the object 50 with respect to the cameras 54 and 56 and with respect to the surrounding space in which the object is located. In this step, the object 50 is set up in the room or other space where it is to be photographed at a position with respect to the confines of the space and with respect to the cameras 54 and 56 and their respective fields of view so that the stereo-photographs may be taken. Stated another way, the object 50 is properly placed within the intersecting fields of view of the two cameras and/or the cameras are moved so that the whole object may be photographed properly, with the field of view of each camera subtending the same angle of the object and with the proper perspective maintained between cameras and object.

Step 2 is to establish absolute orientation of the object 50 with respect to the cameras 54 and 56. The term absolute orientation is used to define the condition in which the photographic stereoscopic image (called the model) of the object as seen by the cameras is exactly oriented to the same datum planes of the object. This is preferably accomplished by adjusting the cameras with respect to the object so that the x, y, and z coordinate axes of the cameras are lined up with the x, y and z datum planes of the object. For example, it may be necessary to tilt the cameras around their horizontal or vertical axes to bring the camera planes defined by these axes into a position where they are parallel to the datum planes of the object. This may be accomplished by measuring techniques which are well known in the photogrammetry art and by using any suitable instrument, for example, a phototheodolite. In the absolute orientation step, the film is also aligned with respect to the cameras so that these same films may later be properly aligned in a stereo-plotter. This is accomplished by placing fiducial marks on the camera and/or film and aligning the various marks. The fiducial marks on the film are then used to align the films in the stereo-plotter. In this manner, absolute orientation is obtained between the object, cameras, and stereo-plotter.

After object orientation and absolute orientation have been established in steps 1 and 2, stereo-pair photographs of the object 50 are taken with the cameras 54 and 56, in step 3. The cameras 54 and 56 are selected to be the same type and they preferably use flat plate films in order to minimize the film distortion which might be introduced if flexible film is utilized. It should be realized that the lenses and other parts of the cameras 54 and 56 are selected to assure the taking of the stereo-pair within the spacing from the cameras to the object. The design of the various camera features is well known in the present state of the art and no further description is needed.

The stereo-pair photographs taken in step 3 are placed in a first order stereo-plotting instrument, which may be any one of a number of suitable types, and absolute orientation of the photographs with respect to the plotter is accomplished in step 4. In this instance the absolute orientation includes the steps of (1) scaling the model (stereo-pair) to the proper size for the plotter, which may be accomplished by enlarging or reducing the photos taken by the cameras or originally using camera film plates of the proper size; (2) bringing the model datum plane parallel to the plotter datum plane or plotter photograph holders, which is accomplished by adjustment of the plotter photograph holders; and (3) positioning the model with respect to the plotter, which is done by aligning the fiducial marks on the photographs with corresponding fiducial marks on the plotter. As can be realized, there is now absolute orientation between the object datum planes and the stereo plotter because of the orientation effected in steps 2 and 4.

In the operation of the stereo-plotter, the stereo-pair photographs are projected for observation and measurement. The stereo-plotter produces a movable measuring point which is used to locate various points on the model and the x, y and z coordinate of the selected model points are read out. In operation, a cross-section of the model may be plotted by determining the x, y and z coordinates of the plotter measuring point as the plotter measuring point is moved by the operator along a certain portion or profile of the model. For example, with respect to the object 50 of FIGURE 1, the plotter measuring point can be moved up the right side of the stereo model of the rectangular object, across the top and down the left side. The plotter reads out the x, y and z coordinates, which may be recorded, at each model point at which the measuring point is stopped thereby giving a cross-sectional profile of the model and the original object 50.

There are a number of plotters which may be utilized with the present invention. Some of these are: Galileo Model 4, manufactured by Officine Galileo of Italy; Wild Model A7, manufactured by the Henry Wild Surveying Instruments Supply Co. of Heerburg, Switzerland; or the Zeiss C8, manufactured by the Zeiss Aerotopograph Co. of Germany. Other suitable first order stereo plotters may also be utilized.

For each cross-section of the stereo model that is taken a graphical restitution of the measured points produces a profile of that cross-section. Therefore, by taking a number of such cross-sections a number of profiles are produced which when properly placed, correspond to the shape of the object. The number and location of the cross-sections to be taken depends upon the original object being photographed. For example, more cross-sections are needed for a complex shape than for a simple symmetrical shape. The various cross-sections are individually developed from the particular stereo-pair taken of the object which has the desired cross-section. Therefore, one or more stereo-pairs may be needed to completely restitute the object. The profiles which are developed from the stereo model cross-sections are therefore used to graphically restitute the original object and they may also be used to numerically restitute the object. Both of these operations are described below.

All of the stereo-plotters described above have shafts, or a rack and pinion assembly, or other suitable output devices for the x, y and z coordinate outputs. The positions of these output devices are representative of the x, y and z coordinates that the plotter is measuring at any one instant. The coordinate information represented by the positions of the output devices may be used in a number of ways to display the coordinates measured by the plotter and in the present invention. The x, y and z coordinate outputs from the plotter output devices are used to operate devices which both graphically and numerically restitute the object.

In the numerical restitution, step 5, the $x$, $y$ and $z$ coordinates represented by the positions of the three output devices of the plotter are converted into a digital number. Therefore, for each point measured on the stereo model digital numbers are produced which correspond to the $x$, $y$, and $z$ coordinate positions of that point and a series of digital numbers are produced corresponding to all of the points measured on the cross-section. In this manner a numerical representation of a cross-section of the stereo model and the original object is established.

In step 6, the digital numbers of the measured points are fed into a computer in which a mathematical smoothing process is performed. This operation is completely mathematical and is performed by the computer in accordance with a predetermined program. The output of the computer of step 6 is the final program which is fed into the automatic machine tool for making the finished object.

The computer operation of step 6 is utilized to develop the equation of the profile line between two points which are measured by the stereo plotter in step 4 and numerically formed in step 5. Since it is impossible to measure an infinite number of points on the model to obtain a continuous line, the measuring points are arbitrarily selected at various poistions. These positions may be determined, for example, by observing the numerical coordinate position of the plotter measuring point and making the measurements as desired. For example, measurements of the $z$ coordinate may be made at intervals of a specified number of numerical coordinate units in the $y$ direction while staying at a constant $x$ coordinate position. Therefore a profile for a cross-section is made in the $y$ direction, which is constant in the $x$ direction, and varies in $z$. Of course in the more usual case, each measured point will vary in two or all three coordinates from the preceding measured point, e.g. in measuring on a curve. Therefore some way must be provided for "smoothing" the line connecting two points. In step 6, the computer derives the equation of the profile line between the measured points thereby "smoothing" the line before printing out the final program for the automatic machine tool so that the final program will represent a smooth line rather than a series of discretely placed points. Any suitable technique already available in the computer art may be utilized for producing the smoothing equations of step 6 including those described in the paper in Business Week.

In step 7, the computer of step 6 produces a numerical program or numerical tooling control tape which may be in the form of a punch tape, magnetic tape, punch cards etc. This is the final program which controls an automatic machine tool to produce the finished part, die, mold, etc. in step 8. As described above, machines are presently in existence which can perform all of the necessary machining operations in response to an automatic computer program.

In some cases it may be desirable to graphically restitute the original photographed object or cross-sections thereof, for example, for the purpose of making cross-sectional templets of the original object. This is accomplished in step 9 by taking the $x$, $y$, and $z$ coordinate outputs from the stereo plotter and using them to graphically reproduce the points which are measured. In one form of the invention the $x$, $y$, and $z$ outputs from the stereo plotter are applied to an electronic servo drive to control a plotting table which has fixed thereon a paper or other suitable drawing material. A stationary drawing instrument, such as a pencil, rests on the paper and as the plotter is moved to the different measuring points the plotting table is moved in a corresponding manner by the servo drive. A profile is thus produced on the paper by the measured points which are read out by the plotter.

It should also be realized that another arrangement for graphical restitution may be utilized wherein a movable marking device is driven over a fixed plotting table and paper.

In order to make a templet from the graphically reproduced profile, the profile is read by an electronic or manually operated line follower in step 10 which controls an automatic templet making device, for example, a cutting tool in step 11. The graphical profile may be completed for the purpose of the line following operation by manually connecting the marked points or smoothing the lines joining these points by the use of a computer. Suitable line followers are well known in the art and no further description is necessary. The line follower is used to control an automatic templet maker which cuts out a two-dimensional templet corresponding to the graphical profile and the object cross-section.

It should be realized that the stereo photos of the object used in the plotter may be considerably reduced in size as compared to the size of the original object. In some instances it may be desirable to obtain full scale numerical and graphical restitution so that the numerical program and graphical profile are to the same scale as the original object. The increase to full object scale may be accomplished before graphical and numerical restitution by mechanical or electronic multiplication of the plotter $x$, $y$ and $z$ outputs.

Figure 3:
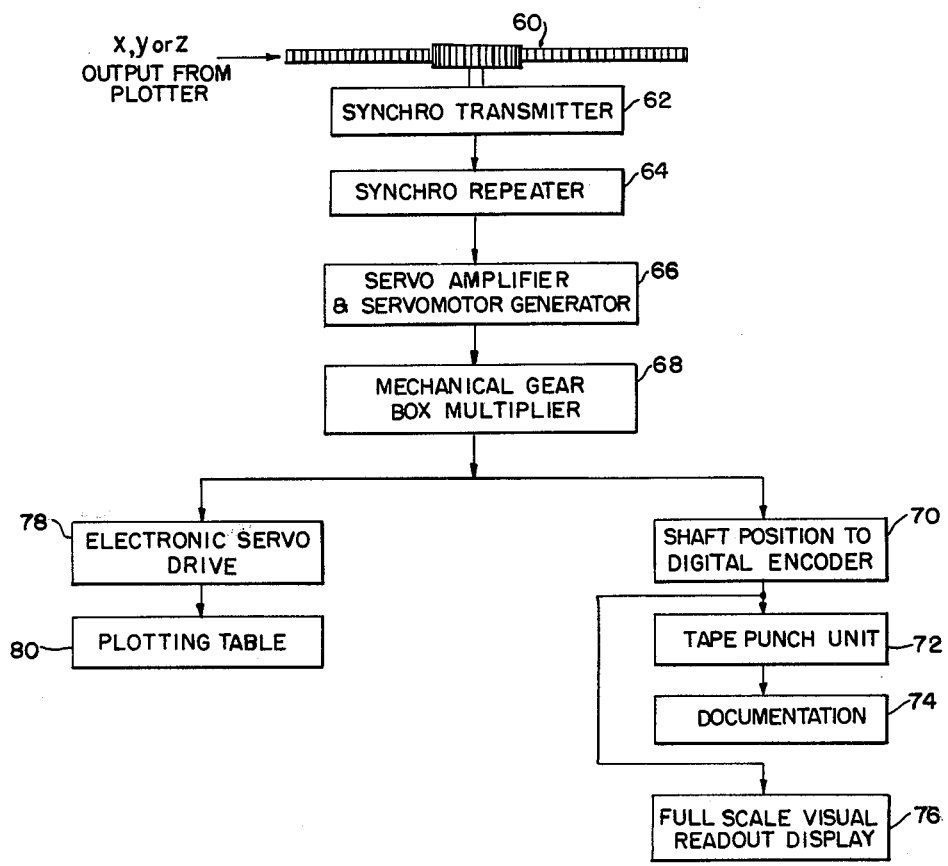
FIGURE 3 shows a schematic block diagram of a portion of the system of FIGURE 2.

To more fully explain the graphical and numerical restitution of the object, reference is made to FIGURE 3 which shows the system to be used with the $x$, $y$ and $z$ outputs of the stereo plotter. It should be realized that although only one system is shown, a similar system is necesary for each shaft in order to obtain all of the information necessary for the three coordinates. Of course, parts of one system may be used for all three coordinates. In FIGURE 3, the $x$, $y$, or $z$ output is shown as a rack and pinion drive 60. The output gear of the rack and pinion moves the input shaft of a synchro-transmitter 62 which produces an output voltage proportional to the degree of rotation of the input shaft. The transmitter 62 therefore produces a voltage which is representative of the position of a coordinate output device of the stereo plotter which in turn corresponds to the position of one coordinate of the plotter measuring point. The synchro-transmitter 62 is connected to the input of a synchro-repeater 64 whose output is applied to the input of a servo amplifier and servomotor generator 66. The output shaft of the servomotor generator is turned a number of degrees as determined by the input voltage applied thereto. Therefore, the position of the plotter rack and pinion for one coordinate output is converted into a servomotor output shaft position. All of the parts in the synchro and servomotor drive system are conventional in the art and no further description is needed.

In order to obtain the scaling factor to make the graphical and numerical restitutions the same scale as the original object, the servomotor output shaft is connected to a mechanical multiplier, which is preferably a gear train multiplier. This device is conventional in the art and its function is to multiply the servomotor output shaft rotational movement by the desired scale factor so that the proper scale for graphical and numerical restitution is obtained.

The output shaft of the mechanical gear box multiplier is connected to a shaft position to digital encoder 70. As the gear box output shaft is rotated, it drives the shaft position encoder, which translates the shaft position into an electrical signal. This signal is the digital representation of the analog voltage supplied by the synchro-repeater. Many devices are available for performing this analog to digital conversion. It should be realized that a digital number is produced to represent each coordinate output of the stereo-plotter.

The output of the encoder 70 is applied to the input of a tape punch unit 72 which documents the digital number output of the encoder onto a suitable record. The tape punch unit, may be a suitable device which either punches holes in the tape in digital code, prints numbers on a tape, or operates a magnetic device for recording the digital number. Other suitable types of documentation may also be utilized. In a preferred embodiment of the invention, the tape punch is manually controlled by the plotter operator so that when he wants to record the coordinates of a measured point a switch is pressed which actuates the tape punch unit to record the information present at the output of the encoder 70.

A full scale visual read-out display 76, for example, a plurality of visual display gas counter tubes, such as the type called Nixie tubes which are manufactured by Burroughs Corp., Electronic Tube Division, Plainfield, New Jersey, are also connected to the encoder output. The gas counter tubes have display numbers 0 to 9 and a number corresponding to each of the digital bit numbers at the encoder output is displayed on a corresponding gas counter tube. Therefore, the x, y, and z coordinate readings of the stereo plotter are always visually displayed and these serve as a guide for the operator in making the profile and also for operating the documentation mechanism.

To perform the graphical restitution, the output of the multiplier 68 controls an electronic servo drive mechanism 78 which in turn controls one direction of movement of a plotting table 80 or a pantograph type marking instrument. The other two directions of motion are controlled by similar systems. As described previously, the servo drive moves either the marking instrument or the plotting table to record the plotted measuring points.

It should be realized that various modifications of the system may be utilized. For example, rather than use the mechanical gear box multiplier 68, an electronic multiplication circuit may be utilized. In a circuit of this type, for example, the servomotor output shaft 66 drives a potentiometer pick-off and the potentiometer output voltage is varied accordingly. The voltage applied to the potentiometer, and hence the pick-off voltage is suitable to give the desired scale factor multiplication. The voltage from the potentiometer is then applied directly to an analog to digital encoder which produces the digital numerical representation of the x, y, and z coordinates and also to the electronic servo drive 78 for producing the graphical restitution.

Therefore it can be seen that a process and system has been described in which physical objects may be graphically and numerically restituted. By using the principles of the present invention it is possible to make two and three dimensional articles, objects, tools, dies, etc., from photographs taken of the actual object, model, cast, etc. It should be realized that a finished article may be produced by the automatic machine tool or dies can be made for eventually producing the article. The invention is also not limited as to the size and/or shape of the objects which can be restituted.

Although a particular structure has been described, it should be understood that the invention should not be limited to the particular embodiment of the invention shown by way of illustration, but rather to the scope of the invention covered by the appended claims.

What is claimed is:

1. A system for reproducing an object using photogrammetric techniques comprising means for producing a stereo-pair photograph model of said object, stereo-plotter means for measuring the coordinate locations of various points of said model in of least two dimensions, means for producing a numerical program representative of the measured coordinate locations of the various points, and means responsive to said numerical program for producing a physical reconstruction of said object.

2. A system for reproducing an object as set forth in claim 1, wherein means are provided for producing absolute orientation between said object and said means for producing said photographic model.

3. A system for reproducing an object as set forth in claim 1 wherein means are provided for producing a smoothed numerical representation between the measured coordinate locations represented by the numerical program.

4. A system for reproducing an object as set forth in claim 1 wherein means are provided for scaling the numerical representation to correspond to the same scale as the photographed object.

5. A system for numerically restituting an object using photogrammetric techniques comprising means for producing a stereo-pair photograph model of said object, means for producing absolute orientation between said object and said means for producing said model, stereo-plotter means for measuring the coordinate locations of various points of said model in at least two dimensions, and means for producing a numerical program representation of the measured coordinate locations of the various points.

6. A system for reproducing an object comprising means for producing a stereo-pair photograph model of said object, means for producing absolute orientation between said object and said means for producing said model, means for measuring the coordinate locations of various points of said model, means for producing a digital numerical program representative of the measured coordinate locations of said various points, and means responsive to said digital numerical program for producing a physical reconstruction of said object.

7. A system for numerically restituting an object comprising means for producing a stereo-pair photograph model of said object, means for measuring the coordinate locations of various points of said model, means for producing a numerical program representation of the measured coordinate locations of said various points, and means for scaling the numerical representation of the measured coordinate locations of said various points to correspond to substantially the same scale as the scale of the object.

8. A system for numerically restituting an object comprising means for producing a stereo-pair photograph model of said object, means for measuring the coordinate locations of various points of said model, said last named means also having outputs whose respective positions are representative of said coordinate locations of said various points, means connected to said outputs for producing a digital numerical program representation of the measured coordinate locations of said various points, and means connected between said outputs and said numerical representation producing means for scaling the digital numerical program representation to correspond to the same scale as the photographed object.

9. A system for reproducing an object comprising means for producing a stereo-pair photograph model of said object, means for measuring the coordinate locations of various points of said model, means for producing a digital numerical program representative of the measured coordinate locations of said various points, means responsive to said digital numerical program for producing a physical reconstruction of said object, and means for scaling the digital numerical program to represent substantially the same scale as the object whereby the physical reconstruction of said object is also substantially the same scale as said object.

10. The method of producing a numerical program representation of an object which is located in a space comprising the steps of providing stereo cameras for taking stereo-photograph pairs of said object, orienting said object with respect to said space and said cameras, obtaining absolute orientation between said object and said cameras, taking said stereo-photograph pairs and producing a stereo-model of said object, measuring the coordinate locations of various points on said stereo model, and producing a numerical program corresponding to the coordinate locations of the measured points thereby numerically representing said object.

11. The method of reproducing an object which is located in a space comprising the steps of providing stereo cameras for taking stereo-photograph pairs of said object, orienting said object with respect to said space and said cameras, obtaining absolute orientation between said object and said cameras, taking said stereo-photograph pairs and producing a stereo-model of said object, measuring the coordinate locations of various points on said stereo model, producing a numerical program corresponding to the coordinate locations of the measured points thereby numerically representing said object, and using said numerical program to operate an automatic machine which produces a physical reconstruction of said object.

12. A system for numerically restituting an object comprising:
    means for forming an optical model of said object,
    stereo-plotter means for measuring the coordinate locations of various points of said model in at least two dimensions,
    means responsive to said various points measured by said stereo-plotter means for producing a numerical program in digital form representative of the measured coordinate locations,
    and means responsive to said numerical program for producing a physical reconstruction of said object.

13. A system for numerically restituting an object comprising:
    means for forming an optical model of said object,
    stereo-plotter means for measuring the coordinate locations of various points of said model in at least two dimensions,
    means for obtaining orientation between said object, said optical model and said stereo-plotter means,
    means responsive to said various points measured by said stereo-plotter means for producing a numerical program in digital form representative of the measured coordinate locations,
    and means responsive to said numerical program for producing a physical reconstruction of said object.

14. The method of producing a numerical program representation of an object located in space comprising the steps of:
    producing an optical model of said object,
    measuring the coordinate locations of various points of said model,
    producing in response to the measured coordinate locations a numerical program corresponding to the coordinate locations of the various points,
    and operating a machine tool in response to said program to produce a physical reconstruction of at least a portion of said object.

15. The method of claim 14 wherein the step of producing the numerical program includes the production of a digital numerical program.

16. The method of producing a numerical program representation of an object located in space comprising the steps of:
    producing an optical model of said object,
    orienting said object with respect to space,
    measuring the coordinate locations of various points of said model,
    producing in response to the measured coordinate locations a numerical program corresponding to the coordinate locations of the various points,
    and operating a machine tool in response to said program to produce a physical reconstruction of at least a portion of said object.

17. The method of claim 16 and further comprising the step of absolutely orienting said optical model with respect to said object and said space.

18. The method of producing a numerical program representation of an object located in space comprising the steps of:
    producing an optical model of said object,
    measuring the coordinate locations of various points of said model,
    and producing in response to the measured coordinate locations a numerical program corresponding to the coordinate locations of the various points.

References Cited by the Examiner

UNITED STATES PATENTS

| | | | |
|---|---|---|---|
| 1,618,804 | 2/27 | Bontempi | 90—13.1 |
| 1,980,981 | 11/34 | Cooke | 156—58 |
| 2,335,127 | 11/43 | Ling | 156—58 |
| 2,720,029 | 10/55 | Eliel. | |
| 2,910,910 | 11/59 | Rosenfeld et al. | |
| 3,052,974 | 9/62 | Williams | 29—407 |
| 3,061,918 | 11/62 | Damm | 29—407 |

WHITMORE A. WILTZ, *Primary Examiner.*

EARL M. BERGERT, THOMAS H. EAGER,
*Examiners.*